2,901,322
METHOD AND COMPOSITION FOR PRODUCING BORON TRIHALIDES

Norman T. Sprouse, Whittier, and Glenn H. McIntyre, Jr., Monterey Park, Calif., assignors to United States Borax & Chemical Corporation, Los Angeles, Calif., a corporation of Nevada No Drawing. Application September 9, 1957
Serial No. 682,575

6 Claims. (Cl. 23—205)

This invention relates generally to the production of boron trihalides other than the fluoride by reaction of carbon, the appropriate halogen gas and anhydrous boric oxide ($B_2O_3$) at elevated temperature.

A primary object of the present invention is to provide an economical and convenient method of producing boron trihalides by carrying out the described type of reaction in a continuous manner.

The invention relates more particularly to the type of continuous operation in which the solid reactants, that is the carbon and boric oxide, are mixed together in granular or powdered form and are supplied to the top of a reaction column, the halogen being supplied in gaseous form to the bottom of the column. On heating the reaction zone to a suitable temperature, typically 700° C. or higher, the ascending halogen reacts with the descending carbon and boric oxide in general accordance with the formula $$B_2O_3 + 3C + 3X = 2BX_3 + 3CO$$

where X denotes a halogen other than fluorine, that is, chlorine, bromine or iodine. The resulting boron trihalide and carbon monoxide are typically led off near the top of the reaction column, together with any other gaseous products that may appear; and any solid residue is removed, preferably in an effectively continuous manner, at the bottom of the column.

We have discovered that, when an attempt is made to operate a reaction column continuously in the manner just described, the the simple admixture of solid reactants does not, as might be expected, move smoothly down the column to replace the material consumed by the reaction. Instead, the solid reactants form lumps which tend to bridge the reaction column, or even become so sticky as to adhere directly to the walls. The uniform movement of material under the action of gravity is thereby prevented, and convenient and economical operation of a continuous process is rendered impossible.

We have discovered that these difficulties are caused by the fact that the boric oxide in the reaction mixture fuses at the temperature of the reaction zone, and that the resulting mixture of particulate solid carbon and fused boric oxide forms a plastic mass of great viscosity and stickiness.

In a batch process for producing boron trihalides, the present difficulties do not ordinarily occur. For the solid reactant mixture is then ordinarily filled into the reaction vessel at a moderate temperature well below the fusing temperature of boric oxide, and remains substantially static throughout reaction. However, such a batch process is inherently cumbersome and inconvenient for satisfactory operation on a large scale, and is therefore useless for fulfilling the objectives of the present invention.

Another type of known procedure for carrying out the described reaction divides the reaction into two distinct phases. The solid ingredients are first mixed and heated in absence of any halogen to a temperature at which the boric oxide is partially reduced, liberating gaseous carbon monoxide and producing a spongy solid made up of residual carbon and partially reduced boric oxide. After cooling, that solid is broken up, and the resulting granular material is then again heated and is reacted this time with the desired halogen. That type of operation does not answer the needs of the present invention. The initial reaction of boric oxide with carbon in absence of halogen requires the relatively high temperature of about 1200 to 1300° C. It is unreasonably expensive and inconvenient to produce so high a temperature in large scale commercial operations, particularly when such temperature accomplishes only a subsidiary and incomplete reaction.

We have discovered a relatively simple, convenient and economical method of preparing a mixture of particulate carbon and boric oxide to produce a free-flowing granular feed composition that remains effectively free-flowing even above the fusion temperature of the boric oxide. By first subjecting the solid reactants to that preparative treatment, we are able to supply them effectively continuously to the reaction zone and to carry out the reaction with halogen gas at any desired reaction temperature continuously and efficiently without operating difficulties.

The preparative treatment which thus permits economical and continuous production of boron trihalides may utilize either one of two main procedures. In accordance with our presently preferred procedure, we first mix together finely divided carbon and boric oxide in a weight ratio which is typically from about 1:2 to about 1:1. That weight ratio corresponds approximately to an amount of carbon between one and two times the theoretical stoichiometric amount required by the above equation. It may be noted that the equation given above is somewhat idealized. For example, in actual practice a portion of the carbon monoxide produced by the indicated reaction is usually oxidized to carbon dioxide. The ratio of carbon dioxide to carbon monoxide produced varies with detailed conditions of the reaction, typically from about 1:2 to 1:1 by volume. Hence the actual stoichiometric requirement of carbon is somewhat less than indicated by the above theoretical equation. However, for the sake of clarity it is convenient for most purposes to treat the reaction as corresponding exactly to the theoretical equation, and carbon to boric oxide ratios will be stated on that basis.

The carbon in the described mixture may, for example, be furnace black, or finely divided charcoal, typically less than about 200 mesh. The boric oxide is typically finer than about 60 mesh, United Standard Sieve Sizes. We form that mixture of fine boric oxide and carbon into granules or pellets of moderate size, typically from about 1/16 to about 1/2 inch in maximum dimension. We have found that the described type of mixture is highly self-adherent, particularly when furnace black is employed, and can be formed into pellets of satisfactory strength quite readily. That may be done conveniently by means of machines of known type, such as roll presses, for example, which are designed for pelletizing adherent powdered materials. The strength of the pellets may be increased by forming them at a temperature above the fusing point of boric oxide.

The described pellets are then coated externally with additional carbon, which may be of any type that adheres effectively to the pellet surface. That coating may, for example, be formed of the same type of carbon employed in the pellet itself. When furnace black or finely divided charcoal is employed as coating material, for example, the formed pellets may be coated by simply tumbling them in an excess of such carbon. The coating may be made to adhere more firmly by carrying out the coating procedure at a temperature above the fusion temperature of boric oxide. The pellets thus acquire an adherent coating which is quite thin but substantially continuous. The amount of carbon in such coating is typically of the same order as that already described as being contained in the pellet core.

The resulting carbon coated pellets are preferably thoroughly dried before use, and may be subjected to other treatment as desired, such as would be appropriate for treating the boric oxide and carbon prior to reaction with halogen. The detailed structure of the described granules does not interfere with such treatment, but rather facilitates it.

The described pellet structure typically contains an overall ratio of carbon to boric oxide between about 1:1 and about 3:1 by weight. That corresponds to an amount of carbon between about two and about six times the stoichiometric amount required by the above equation. We have found such an excess of carbon of highly reactive type to facilitate carrying the reaction to completion promptly and smoothly.

It may be advantageous, especially when the carbon coating is to be made relatively thick, to employ a type of carbon for the coating that is less reactive chemically, and also less expensive, than the carbon employed in the pellet core. When that is done, it may be desirable for the coating to comprise as much as three times the theoretical stoichiometric amount of carbon.

When the solid reactants are prepared in the manner that has been illustratively described, we have found that the resulting feed composition remains substantially free-flowing even at temperatures well above the fusion temperature of boric oxide. However, pellets of mutually unreacted finely divided carbon and boric oxide formed without the coating of carbon are not free-flowing under conditions of the reaction with halogen, even when they have been formed at a temperature above the fusing temperature of boric oxide. Apparently the coating of carbon prevents adhesion between adjacent pellets even after the core material of each pellet has become plastic and sticky.

We have found further that the carbon coating of the pellets does not, as might be expected, interfere with prompt and complete reaction of the core material with gaseous halogen. Presumably the carbon particles, although effectively barring passage of the fused boric oxide, remain effectively porous to gaseous halogens.

An alternative manner of preparing an effectively free-flowing composition of boric oxide and carbon for reaction with halogens in accordance with the invention is to adhere a mixture of finely divided boric oxide and carbon to the exterior surfaces of pellets of carbon. The carbon pellets are typically from about 10 to 20 mesh to about ½ inch in size. Granules of carbon from many different sources may be employed as pellets for this purpose. Such carbon may comprise granules of petroleum coke, coal coke, or charcoal, for example, or may be formed by pelletizing finely divided carbon of any suitable type such as furnace black.

We have discovered that when such pellets of carbon are brought into contact, as by tumbling for example, with a mixture of finely divided carbon and boric oxide, the mixture adheres strongly to surfaces of the carbon pellets. The coating process may be carried out at temperatures above the fusion temperature of boric oxide. The mixture of powdered carbon and boric oxide employed for coating the carbon cores is typically of the type, proportions and size distribution already described as being suitable for producing cores for carbon coating in the previously described procedure. Although such a mixture of finely divided boric oxide and carbon by itself becomes plastic and sticky when reacted with halogen, we have found that when such a mixture is adhered to discrete carbon pellets within the described size range the resulting coated pellets remain effectively free-flowing at all practical working temperatures.

We have discovered, further, that the coated carbon pellets just described remain effectively free-flowing at reaction temperatures above 600° C. even when additional mixture of finely divided and highly reactive carbon and boric oxide is provided in a quantity such that only a portion of the interstices between the coated granules is filled by such mixture. Compositions of that type permit introduction of a larger volume of active material into a reactor of given dimensions, while maintaining free access of halogen to the solid charge and free movement of the charge downwards in the bed under the action of gravity. The advantages of counter-current movement of the gaseous and solid components are thus fully maintained as is also the case with the first described method of charge preparation.

The overall ratio of carbon to boric oxide in compositions utilizing cores of granular carbon may have a value from about 3:1 to about 10:1. The upper portion of that range is particularly effective for compositions in which substantially all of the mixture of finely divided carbon and boric oxide is adhered to surfaces of the carbon cores; and the lower portion of that range is particularly effective for compositions in which such mixture is provided in excess, so that a portion of it partially fills interstices between the coated cores.

The carbon core of the pellets just described is typically essentially free of boric oxide. When, as is preferred, the coating mixture itself contains at least a slight excess of carbon, the boric oxide of the coating is typically converted essentially wholly to boron trihalide without appreciably attacking the carbon core. That is particularly true when the coating carbon is of chemically reactive type, such as furnace black, and the core is of a less reactive type, such as petroleum coke or an economical grade of charcoal. The residual cores can thus be removed at the bottom of the reaction column and recoated with a mixture of boric oxide and reactive carbon in preparation for another cycle.

We claim:

1. A solid reactant composition for continuous production of $BCl_3$ which comprises discrete granules, each granule consisting essentially of an inner core portion and an outer coating portion contiguous therewith, said inner core portion consisting essentially of an admixture of carbon and boric oxide and said outer coating consisting essentially of carbon.

2. The composition of claim 1 wherein said inner core portion consists essentially of carbon and boric oxide in a weight ratio of from 1:2 to about 1:1.

3. The composition of claim 1 wherein the inner core and outer coating contain an overall ratio of carbon to boric oxide of from about 1:1 to about 3:1 by weight.

4. In the continuous production of $BCl_3$ by reaction of carbon, boric oxide and chlorine at a temperature above the fusion point of boric oxide, the improvement which comprises forming discrete granules of the carbon and boric oxide and substantially continuously feeding such granules to a heated reaction chamber containing chlorine, said granules each consisting essentially of an inner core portion and an outer coating portion contiguous therewith, said inner core portion consisting essentially of carbon and boric oxide, and said outer portion consisting essentially of carbon.

5. The method of claim 4 wherein said inner core consists essentially of carbon and boric oxide in weight ratio of from about 1:2 to about 1:1.

6. The method of claim 4 wherein said granules each contain an overall ratio of carbon to boric oxide of from about 1:1 to about 3:1 by weight.

References Cited in the file of this patent

UNITED STATES PATENTS

| | | |
|---|---|---|
| 2,369,212 | Cooper | Feb. 13, 1945 |
| 2,805,141 | Apuli | Sept. 3, 1957 |